United States Patent Office 3,702,338
Patented Nov. 7, 1972

3,702,338
HYDROXY-METHYLATED DERIVATIVES OF
RESIN ACIDS, THEIR USE IN ELASTOMERIC
POLYURETHANES
John B. Lewis and Glen W. Hedrick, Lake City, Fla.,
assignors to the United States of America as represented
by the Secretary of Agriculture
No Drawing. Filed May 12, 1970, Ser. No. 36,672
Int. Cl. C07c 69/74
U.S. Cl. 260—468.5                                    1 Claim

ABSTRACT OF THE DISCLOSURE

The preparation of a new series of polyols derived from naval stores is described and their use in polyurethanes is demonstrated. Small amounts of these resin acid derivatives give added strength to polyurethane films prepared from propylene glycol polyethers and could very well be useful intermediates for industry. Increasing amounts of these new glycols blended with trimethylolpropane, 1,4-butanediol, and a polypropylene glycol and reacted with TDI gave clear strong films with tensile strengths around 5000 p.s.i. Further addition resulted in harder, more brittle films. Because of the brittle character of most of the films, use of the polymers probably would be limited to coating applications. On the other hand, change in the formulation in one instance resulted in films having fair low temperature and elastomeric properties. The diisocyanate requirements are reduced when the polyols are used as a component of the glycol system.

A non-exclusive, irrevocable, royalty-free license in the invention herein described, throughout the world for all purposes of the United States Government, with the power to grant sublicenses for such purposes, is hereby granted to the Government of the United States of America.

For a number of years a study has been underway to make rosin poly-functional and hence, more useful by addition of hydroxymethyl groups through reaction of formaldehyde with resin acids. Another useful variation resulted in similar products by the oxonation of rosin.

Levopimaric acid in situ in pine oleoresin (pine gum) or in the pure state reacts with formaldehyde giving the Diels-Alder adduct (I) which is readily converted to the acid (II), the glycols (IIIa and IIIb), or the ester (IVa and IVb). This invention describes the preparation of the glycols (IIIb) and the esters (IVa and IVb) and a progress report on their use in some polyurethane films which may find use in coatings and elastomers. In this invention the glycols are referred to as rosin derivatives and rosin polyols.

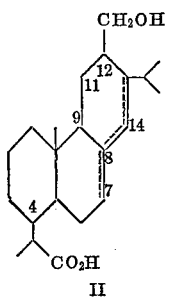

II

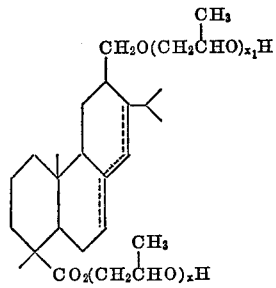

IVa: $x=1$: $x_1=0$
IVb: $x=5$: $x_1=3$

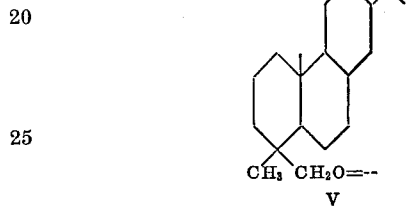

V

Urethane technology is highly developed and many types of intermediates—glycols, isocyanates, catalysts, solvents, etc.—have been developed which have resulted in many end use products. Since there are many variations, it was decided to consider only a few of the formulations for polymer preparations. More or less standard commercial formulations have been published for elastomeric polyurethane films involving the use of polypropylene glycol or other polyurethanes with tolylene (toluene) diisocyanate (TDI). The objective in this invention was to determine the effect the resinyl moiety had on polymer properties and to do this, the resinyl moiety was introduced into the polypropylene glycol polyether chain by reacting II and IIIa with propylene oxide. Polyethers and esters-ethers (IIIb, IVa, and IVb) were blended with polypropylene glycol 1000, trimethylolpropane, and 1,4-butanediol thus obtaining glycol mixtures having varying content of the moiety. In one instance IVa was mixed with polpropylene glycol 2000 and trimethylolpropone.

Kolb [K. E. Kolb, U.S. Pat. No. 2,901,505 (1959)] describes the reaction of alkalene oxides and carboxylic acids in dimethyl formamide, DMF, as forming the monoglycol esters. In using this procedure II reacted with more than one equivalent of alkalene oxides as evidenced by chemical tests and glpc. Since the extent of polyaddition was not much, the reaction products were used on the basis of their hydroxyl equivalent, OHE, and in the text are considered monoglycol additions. Polyester formation from II was possible and may have occurred to some extent. This was not considered detrimental since the end product would be a diol and useful in subsequent reactions. The hydroxymethyl group at the C–12 position did not react unless catalyzed by catalysts other than DMF. With KOH as a catalyst in dioxane, the 12-hydroxymethyl group for some reason was more sluggish than the glycol ester group at the C-4 position and an average of about three moles of propylene oxide was all that could be added to the methylol group (Table I). It is believed that hydroxymethyl at the C-4 and C-12 position of IIIa reacted with propylene oxide at about equal rates because tetrahydroabietanol and the 12-hydroxymethyl group of IVa seemed to react at about the same rate, neither was particularly sluggish.

Some polymer formulations with TDI, trimethylolpropane, TMP, 1,4-butanediol, and polypropylene glycol, PPG 1000 and their properties are given in Table II. Item 1 is a formulation reported by the Du Pont Company (PB-2 and PB-4) and is included for comparison with the other polymers from PPG.

TABLE II.—POLYURETHANE FILMS FROM POLYPROPYLENE GLYCOL 1000

| | TMP equivalent | Bu(OH)$_2$ equivalent | PPG 1000 equivalent | TDI equivalent | NCO:OH ratio | Average OHE glycol mix | Tensile strength, p.s.i. | Modulus, 100% | Elongation at break, percent | Comments |
|---|---|---|---|---|---|---|---|---|---|---|
| 1[a] | .6 | [b]0.2 | 0.2 | 1.6 | 1:6:1 | 135.9 | 7,500 | | 40 | Hard brittle film. |
| 2 | 0.39 | 0.45 | 0.5 | 1.41 | 1.05:1 | 214 | 1,200 | 567 | 288 | Soft, pliable, clear elastomer. |
| 3 | 0.45 | 0.45 | 0.45 | 1.60 | 1.19:1 | 197 | 2,847 | [c]4,026 | 188 | Clear, flexible, slightly stiff film. |

[a] Du Pont (PB-2 and PB-4).
[b] 1,3-butanediol.
[c] Elastic modulus.

TABLE I.—COMPARATIVE REACTIVITY OF HYDROXYL GROUPS IN GLYCOL (IVa)

| Ratio oxide to IVa used | Ratio of combined oxide to II | Mole ratio of propylene oxide reacted with: | | |
|---|---|---|---|---|
| | | —CO$_2$C$_3$H$_7$OH | 12-HOCH$_2$— | |
| 4:1[1] | 3:1 | 2:1 | 1:1 | |
| 8:1 | 6:1 | 4:1 | 2:1 | |
| 12:1 | 10:1 | 7:1 | 3:1 | |
| 16:1 | 16:1 | 13:1 | 3:1 | |
| 20:1 | 19:1 | 16:1 | 3:1 | |

[1] Minimum to achieve complete reaction with IVa.

Both II and III are sparingly soluble in propylene oxide and have melting points above the reaction temperatures for alkalene oxides. Because of these properties, a solvent (dioxane) was used to avoid uncontrollable and explosive conditions.

Chitwood and Freure [J. Am. Chem. Soc., 69, 680 (1946)] have shown that the base-catalyzed alcoholysis of propylene oxide resulted in a primary alkoxy derivative and a secondary alcohol. More recently, St. Pierre and Price [J. Am. Chem. Soc., 73, 3432 (1956)] and Dege, et al. [J. Am. Chem. Soc., 81, 3374 (1959)] agreed with this hypothesis and cited a number of other supporting references. This configuration has been used in the formulae in this invention.

Price observed appreciable end group unsaturation from the catalyzed polymerization of propylene oxide and Dege and his collaborators confirmed this and developed methods for determining the extent of the unsaturation based on chemical tests and infrared spectroscopy. If there was end group unsaturation in the glycols reported herein, it was minor since no unsaturation was observed using the test methods referred to above.

The significant point is the amount of TDI and TMP which presumably was required to produce an acceptable film. The formulation in Item 2 was selected as being suitable for modification by incorporation of rosin polyols and has been used as a control. The other Item, 3, was included in Table II to show the effect minor variations in formulation, especially an increase in TDI, had on polymer properties. Tables III, IV, and V give the formulations and test results when the rosin polyols IIIb, IVa, and IVb were substituted in varying amounts for some of the 1,4-butanediol and PPG 1000 used in the control. As the glycols were added, both the butanediol and PPG 1000 had to be decreased to avoid a change in the average hydroxyl value of the glycol mixture of approximately 213.

The effect of the addition of the rosin polyols in increasing amounts was to increase the tensile strength, stiffness, abrasion, and hardness; results which are ordinarily obtained by raising the NCO:OH ratio. Maximum tensile strength was obtained with a resinyl moiety concentration of about 10% for IVa and IVb and 15% for IIIb. The glycol (IVb) seemed to produce the hardest films and IIIb gave the softest films per unit of glycol added.

Specific comments on the tables follows. In Table III there was a rather marked decrease in butanediol in the formulations which was necessary because of the low hydroxyl equivalent value of IVa. In general, the effect of decreasing the butanediol in this manner would result in softer films rather than harder films as indicated.

TABLE III.—POLYURETHANE FILMS FROM PROPYLENE GLYCOL 12-HYDROXYMETHYLDIHYDROABIETATE (IVa)—OHE 205

| | Rosin derivative equivalent | Conc. of (II), percent in film | Bu(OH)$_2$ equivalent | PPG 1000 equivalent | Average OHE glycol mix | Tensile strength, p.s.i. | Modulus | | Elongation, percent | Stiffness T$_f$ °C. | Hardness | Abrasion 10$^{-2}$, percent |
|---|---|---|---|---|---|---|---|---|---|---|---|---|
| | | | | | | | Elastic | 100% | | | | |
| 1 | [a]0.12 | 5.0 | 0.38 | 0.45 | 212 | 1,678 | | 865 | 277 | | | |
| 2 | [a]0.25 | 10.0 | 0.30 | 0.41 | 212 | 5,317 | 13,000 | 1,290 | 251 | −16.5 | 41 | 0.8 |
| 3 | [a]0.35 | 14.4 | 0.23 | 0.37 | 213 | 5,050 | 49,700 | 1,985 | 220 | 3.0 | 63 | 1.22 |
| 4 | [a]0.49 | 19.9 | 0.15 | 0.32 | 212 | 4,716 | 133,000 | ([c]) | 170 | 7.5 | 79 | 3.02 |
| 5 | 0.50 | 19.4 | | [b]0.33 | 432 | 3,794 | 39,000 | 1,524 | 240 | −21 | 79 | 1.13 |

[a] TMP 0.39 equivalent, TDI 0.14 equivalent. NCO:OH ratio 1.05:1.
[b] PPG 2000 instead of PPG 1000; TMP 0.33 equivalent, TDI 0.141 equivalent, NCO:OH ratio 1.22:1.
[c] Too hard.

TABLE IV.—POLYURETHANE FILMS FROM PROPYLENE GLYCOL ESTER-ETHER (IVb)

| | Rosin derivative equivalent | Conc. of (II), percent in film | Bu(OH)$_2$ equivalent | PPG 1000 equivalent | Average OHE glycol mix | Tensile strength, p.s.i. | Modulus | | Elongation, percent | Stiffness T$_f$ °C | Hardness | Abrasion 10$^{-2}$, percent |
|---|---|---|---|---|---|---|---|---|---|---|---|---|
| | | | | | | | Elastic | 100% | | | | |
| 1 | [a]0.120 | 5.0 | 0.44 | 0.39 | 212 | 1,264 | | 215 | 293 | | | |
| 2 | [a]0.260 | 10.5 | 0.42 | 0.270 | 213 | 5,166 | 8,000 | 780 | 280 | −13 | Soft | 0.31 |
| 3 | [b]0.367 | 15.0 | 0.44 | 0.145 | 213 | 4,750 | 100,000 | ([c]) | 253 | 2.5 | 73 | 0.39 |
| 4 | [a]0.490 | 20.8 | 0.39 | 0.007 | 213 | 5,270 | 16,000 | ([c]) | 194 | 6.0 | 86 | 1.76 |
| 5 | [a]0.614 | 25.1 | 0.25 | | 241 | 3,401 | 247,900 | ([c]) | 44 | 45.5 | 95 | 3.28 |
| 6 | [a]0.734 | 28.2 | | | 307 | 2,883 | 195,664 | ([c]) | 76 | 29.0 | 81 | 9.36 |

[a] OHE 438.4.
[b] OHE 480; TMP 0.39 equivalent for Items 1, 2, 3, 4; 0.34 equivalent for 5; and 0.37 for 6. NCO to OH ratio 1.05:1 for Items 1, 2, 3, 4, 5; and 1:1 ratio for 6; TDI 0.141 equivalent for Items 1, 2, 3, 4; 0.120 for 5; and 0.110 for 6.
[c] Too hard.

TABLE V.—POLYURETHANE FILMS FROM POLYPROPYLENE GLYCOL ETHER (IIIb)

| | Rosin derivative equivalent | Conc. of (V) percent in film | Bu(OH)$_2$ equiv. | PPG 1000 equiv. | Average OHE glycol mix | Tensile strength, p.s.i. | Modulus | | Elongation, percent | Stiffness T$_f$ °C. | Hardness | Abrasion 10$^{-2}$, percent |
|---|---|---|---|---|---|---|---|---|---|---|---|---|
| | | | | | | | Elastic | 100% | | | | |
| 1 | a 0.254 | 10.0 | 0.444 | 0.254 | 213 | 2,561 | 2,537 | 436 | 275 | −14.5 | 48 | 0.28 |
| 2 | a 0.381 | 15.0 | 0.435 | 0.134 | 213 | 4,911 | 9,097 | 694 | 301 | −1.0 | | 0.96 |
| 3 | a 0.520 | 20.5 | 0.430 | | 213 | 5,094 | 47,500 | 1,747 | 244 | 5.0 | 59 | 3.91 |
| 4 | b 0.636 | 25.0 | 0.235 | | 241 | 3,862 | 167,964 | Hard | Hard | −0.5 | 79 | 5.99 |
| 5 | c 0.558 | 23.9 | 0.233 | | 274 | 2,866 | 2,429 | 393 | 347 | −50.0 | (e) | 1.04 |
| 6 d | | | 2.000 | 2.000 | 270 | 4,200 | | | 640 | 800 | | 76 | | a OHE 515.
b OHE 425.
c OHE 505, TMP 0.394 for Items 1, 2, 3; 0.36 for 4; and 0.34 for 5; TDI 1.41 equivalent for Items 1, 2, 3; 1.29 equivalent for 4; and 1.17 equivalent for 5; NCO to OH ratio 1.05:1.
d Schollenberger (1969), modulus at 300%; Shore A hardness; MDI 4.0 equivalent.
e Too soft.

Item 5, Table III is similar to Item 4 in composition. The only difference is in the use of PPG 2000 instead of PPG 1000 and it illustrates the possibilities of variations in formulae. Films in this instance without the rosin polyol with 1.05:1 NCO to OH ratio were soft and tacky.

In Table IV the results of Items 1 through 4 are about as expected. It should be noted that the glycol for Item 3 had a higher OHE value (480) than that used for others of the series and may have had a minor but not very significant effect on the properties since the results seem to correlate well with those of Items 2 and 4. Items 5 and 6 were added to show the effect of larger amounts of the rosin derivative. The films might be useful for coatings but were too brittle and too hard for elastomers.

The first four items for Table V require no comment since the discussion concerning Tables III and IV is applicable here. The formulation of Item 5 was included principally to show that films can be made with reasonably good elastomeric and low temperature properties, T$_f$−50° C.

Item 6, taken from current literature, is added for comparison purposes, [C. S. Schollenberger, Polyurethane Technology, 10, 197 (1969)].

Unless otherwise specified, gas liquid partition chromatograph (GLPC) analyses were made on an F&M 700 chromatograph using a 6 ft. °—98 silicone Hewlett-Packard ⅛ inch column at 235° C.

EXAMPLE 1

12-hydroxymethyldihydroabietic acid (II)

12-hydroxymethyldihydroabietic acid, a mixture of dihydroderivatives, was prepared by hydrogenating 12-hydroxymethylabietic acid. The adduct (I) (525 grams; 1.58 moles) was dissolved in a mixture of 1050 ml. ethanol or methanol and 150 ml. of 3 N hydrochloric acid. This was blanketed with nitrogen, stirred until solution was complete, and allowed to stand overnight. The solvent was partially removed in vacuo. The mass was poured into a water-ice mixture while stirring. Seeding facilitated crystallization. The acid was washed acid-free with water on a Büchner filter, dried at about 50° C. (water aspirator vacuum), and recrystallized from 75% aqueous methanol. An alternate method consisted of dissolving the precipitated acid in ether or benzene, then washing to remove mineral acid. The solvent was removed and the product crystallized from 75% aqueous ethanol. Yield: 480 g.; 91.5%. Calculated for: C$_{21}$H$_{34}$O$_3$. Neutral equivalent: 334.27. Found: 335; M.P. 162–164° C. [reported 166.5–168° C. by Parkin and Hedrick, J. Org. Chem., 30,2356 (1965)].

A more convenient isomerization was achieved by dissolving 15 lbs. of adduct (I) in 35 lbs. methanol, adding 7.5 lbs. of a strong acid ion exchange resin of the sulfonic acid type, warming to 40° C., and agitating until the adduct was all in solution. Isomerization was rapid and complete in about one-half hour. The reaction was monitored by use of ultraviolet spectroscopy. Filtering to remove the resin, adding water to give 75% methanol, and cooling gave 13.6 lbs.; 91% of II. The GLPC chromatogram of the methyl ester had a minor peak for a methyl resinate. A second crop of less pure material was obtained by diluting the filtrate to 60% methanol.

The abietic acid derivative (400 g.; 1.2 moles) in 400 ml. methanol hydrogenated rapidly at room temperature using 6.6 g., 5% palladium-on-carbon catalyst and good agitation; no conjugated diene was left after about 1.5 hours with hydrogen at 10 p.s.i. The catalyst was removed for reuse by filtration of the solution (hot). Crude 12-hydroxymethyldihydroabietic acid (II) crystallized as the solution cooled; 350 g.; M.P. pure 194–195° C. (methanol). GLPC of the unpurified mixture had a major peak (the above) and two minor peaks appearing as shoulders on the major peak. Calcd. for C$_{21}$H$_{34}$O$_3$: neut. equiv., 334.27; hydroxy equivalent (OHE) methyl ester, 348.29. Found: neut. equiv., 336; OHE methyl ester, 350.01.

EXAMPLE 2

Monopropylene glycol ester of 12-hydroxymethyldihydroabietic acid (IVa)

The hydroxy acid (II) (500 g.; 1.49 moles) was dissolved in dry dimethylformamide (500 ml.) and heated to 100° C. in a flask equipped with an agitator and condenser for use with Dry Ice as a coolant. Propylene oxide (100 g.; 1.7 moles) was added dropwise to maintain a gentle reflux. After about 3 hours the acid content was nihil. The bulk of the DMF was removed by distilling in vacuo. The residue was poured into water, dissolved in ether or benzene, and washed, first with dilute mineral acid, and then with dilute soda ash and water. The solvent was removed in vacuo, 100° C. at less than 0.5 mm. Hg pressure, 580 g. Calcd. for C$_{24}$H$_{40}$O$_4$: OHF, 196.16: saponification equivalent (sap. equiv.), 392.32. Found: OHE, 205; sap. equiv. 408. Neut. equiv. of the acid from a saponified sample was 337. GLPC of IVa showed a major peak and at least two minor broad peaks indicative of the esters of dipropylene and tripropylene glycols.

EXAMPLE 3

Mixed polypropylene glycol ether-ester (IVb)

Hydroxy acid (II) (200 g.; 0.6 mole) was dissolved in a dry hydrogen peroxide and acid-free dioxane and charged to a pressure reactor with 2.1 g. potassium hydroxide pellets and propylene oxide (418 g.; 7.2 moles). The reactor (a rocking type) was heated to 140° to 160° C. for 4 hours. The pressure variation was from 188 to 42 p.s.i. at the end of the reaction. The product was removed from the bomb and most of the solvent was distilled (100° C. at 1 mm. Hg). The residue was dissolved in ether, washed with dilute hydrochloric acid, then water until chloride-free and dried over MgSO$_4$. Removal of solvent (100° C. at 1 mm. Hg) gave 507 g. clear, light amber, mobile liquid, acid number 0.3; OHE 438.4; sap. equiv. 876.09. The ether-ester was also prepared from the monoglycol ester (IVa) by dissolving (IVa) in dioxane; adding catalyst, propylene oxide; and proceeding as above.

To determine the reactivity of the two hydroxyl groups on the initial glycol, IVa was reacted neat using potassium hydroxide catalyst with varying amounts of propylene oxide at 140–150° C. Accordingly, IVa was reacted with 4:1, 8:1, 12:1, 16:1, and 20:1 molar equivalents of the alkalene oxide. Determination of sap. equiv., OHE and neut. equiv. of the saponified acid resulted in the data in Table I.

EXAMPLE 4

Polypropylene glycol diether (IIIb)

12 - hydroxymethyltetrahydroabietanol (IIIa) [M.P. 182.5–183.5° C. from methanol-toluene mixture (31 to 69 ratio on weight basis)]. (146 g.; 0.45 mole) was dissolved in dioxane (see above) (146 g.) and reacted with propylene oxide (418 g.; 7.2 moles) using as catalyst, potassium hydroxide (2 g.) in a rocking type pressure reactor. The reaction was complete in 3 hours at 150–160° C. as evidenced by pressure drop. The product was isolated in the same manner as used for IVb, 535 g. amber colored, mobile, viscous liquid; OHE 515.

In another run using 4 mole equivalents propylene oxide, the hydroxyl equivalent was 264. The mixture of acetates on GLPC using a ⅛" x 3', ½% S.E. 30 column gave no peak for the diacetate of the starting glycol (IIIa).

To obtain insight as to the reactivity of the presumably sterically hindered C–4 hydroxymethyl group of IIIa, tetrahydroabietanol (53 g.; .18 mole) was reacted in a closed container at 140–150° C. with propylene oxide (42 g.; 72 mole) in 53 g. dioxane containing .18 g. potassium hydroxide. After 4 or 5 hours the pressure dropped from 100 to 22 lbs. The product (82 g.) (100%) contained (by GLPC) less than 5% tetrahydroabietanol OHE 451; 274 moles propylene oxide added. Neither IIIb or IVb had any discernible end group unsaturation using the methods of Dege et al. [J. Am. Chem. Soc. 81, 3374 (1959)].

EXAMPLE 5

Polymer film formation

The glycols 1,4-butanediol, trimethylolpropane, the rosin derivative, and polypropylene glycol were mixed and degassed at 60° C., 0.2 mm. pressure. The glycol mixture was cooled to 30° C., the isocyanate added, and the mixture warmed to 85° C. (slightly exothermic). The flask was evacuated to exclude air and at the end (40 to 60 minutes) degassed at 0.2 mm. pressure. The clear, almost colorless, mobile liquid was poured hot into molds maintained at 100–110° C. which consisted of a 6" x 6" (inside) aluminum metal frame clamped to a ¼-inch thick aluminum sheet covered with thin aluminum foil. The reaction was poured onto the foil in an amount (about 42 g.) so that approximately 1/16-inch thick films resulted. Two to three hours at 100–110° C. were required for curing. The next day the films with aluminum foil backing were immersed into a dilute hydrochloric acid solution to dissolve the foil that could not be removed readily by hand.

Formulations and polymer properties are tabulated in Tables II through V.

We claim:
1. The monopropylene glycol ester of 12-hydroxymethyldihydroabietic acid.

References Cited

UNITED STATES PATENTS 2,901,505   8/1959   Kolb  ---------------- 260—475

FOREIGN PATENTS 1,385,659   12/1964   France  ------------ 260—486
1,157,623   11/1963   Germany  ----------- 260—468

LORRAINE A. WEINBERGER, Primary Examiner

P. J. KILLOS, Assistant Examiner

U.S. Cl. X.R.

260—24, 611 F, 617.5